Oct. 22, 1963 T. ZIJLSTRA 3,107,369
CAMPING TRAILER AND BOAT
Filed May 19, 1961 4 Sheets-Sheet 1

INVENTOR :
TJEERD ZIJLSTRA
BY: *Otto John Munz*
Attorney.

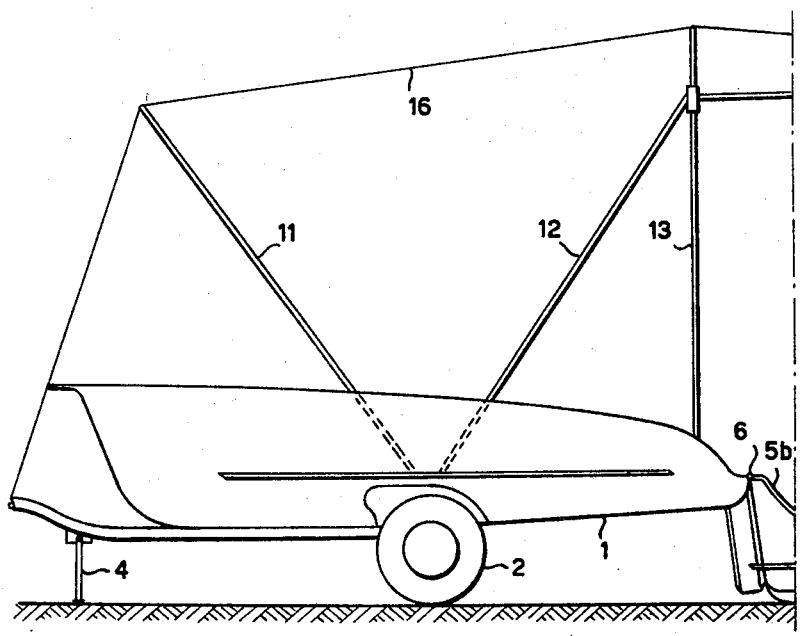

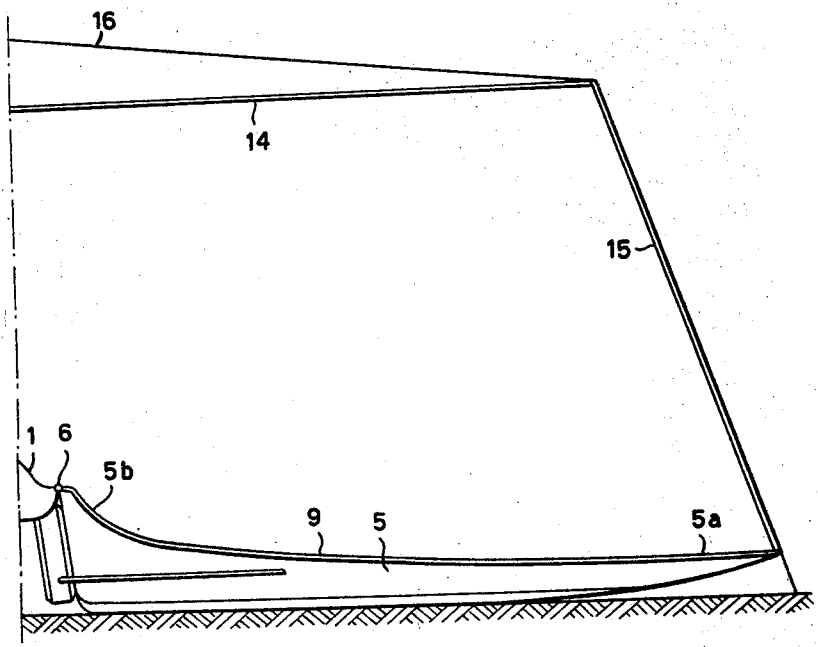

Oct. 22, 1963  T. ZIJLSTRA  3,107,369
CAMPING TRAILER AND BOAT
Filed May 19, 1961  4 Sheets-Sheet 4

INVENTOR:
TJEERD ZIJLSTRA
BY: *Otto John Munz*
Attorney.

United States Patent Office 3,107,369
Patented Oct. 22, 1963

3,107,369
CAMPING TRAILER AND BOAT
Tjeerd Zijlstra, Uiterburen 55, Zuidbroek, Netherlands
Filed May 19, 1961, Ser. No. 111,376
Claims priority, application Netherlands May 21, 1960
5 Claims. (Cl. 9—1)

The invention relates to improvements in camping trailers having a roof which can be used as a boat.

Such trailers are disclosed, for instance in U. S. Patent 2,310,431.

A disadvantage of known constructions is the relatively considerable height of the roof, which, being a relatively large part of the trailer's over-all vertical dimension, makes it difficult to provide for built-in furniture, storing space, windows, doors, etc.

While a trailer of the type mentioned is often preferred because of the improved rearward visibility afforded the driver of a towing car, it has heretofore been difficult to provide a satisfactory vehicle of this type.

The invention provides a trailer with a roof which may be used as a boat, and which is only a little higher than the towing car itself.

For this purpose the invention provides a trailer with a detachable roof usable as a boat, such that the vertical dimension of the roof over the major part of the length of the car is very small but at one end of the boat is considerably larger.

The invention also provides a boat that is very satisfactory for angling, bathing and so on, provided it is used in quiet waters. Furthermore, since the boat has a relatively high stern portion, it has the advantage that an outboard motor or a rudder can be attached very easily.

It is a further object of the invention to provide a lightweight, simple and easily detachable means for adapting the boat for further uses such as sailing or speedboat purposes in less quiet waters.

According to a further feature of the invention the gunwale of the boat is provided with a border groove or channel having an outwardly opening slot that is narrower than the inside diameter of the channel. In this channel one can slide a string or cord, around which a watertight fabric or sheet material has been sewn. By attaching the ends of the string or cord to the high rear portion or stern of the boat it is possible to obtain a boat construction with side walls consisting of watertight fabric or sheet material.

According to still a further object of the invention this fabric or sheet material is easily tensioned in place by an extendable member having one end resting on the bottom of the boat.

Further features and advantages will be explained in the following description of an embodiment and details thereof, shown in the accompanying drawings, in which FIG. 1 shows a side elevation of a trailer according to the invention, in closed condition;

FIG. 2 shows a section of a detail on an enlarged scale;

FIGS. 3a and 3b conjointly show the trailer with its roof or boat part pivoted 180° from the position shown at FIG. 1 and with a tent erected thereover;

Figure 1:
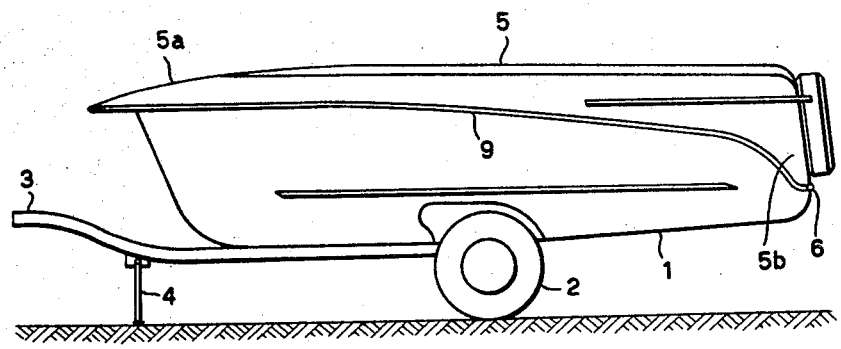

In FIG. 1 the trailer is indicated at 1, supported by a pair of wheels 2, connected by means of a towing pole 3, to a traction device, such as an automobile, not shown; the strut 4 can be swung down when the trailer is at a standstill. The cover 5, at its forward end at 5a has a very small height which at the rear end at 5b is increased and is swingable at 6 by means of detachable pivots or hinges, with respect to the trailer 1 about an axis normal to the plane of the figure.

Figure 2:
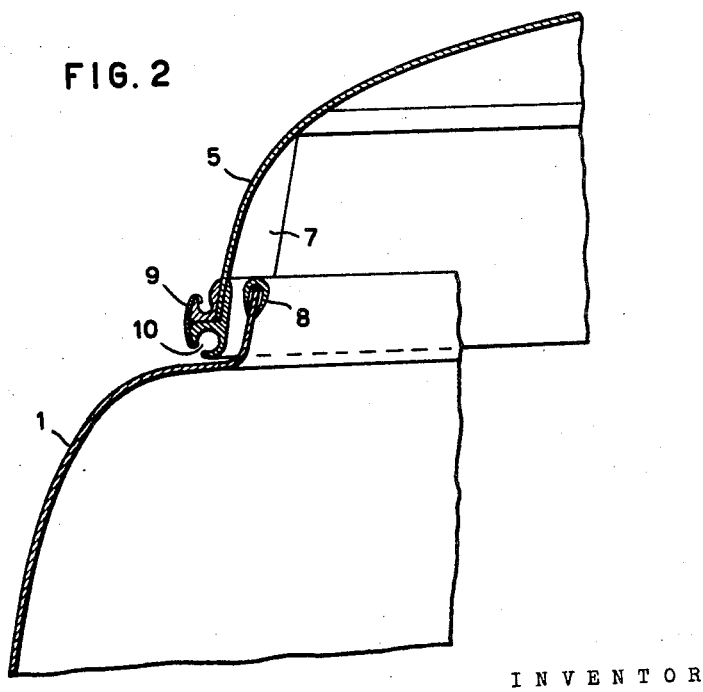

In FIG. 2 a section is shown through part of the gunwale or junction between trailer 1 and cover 5. The trailer 1 has an upwardly directed edge with an edge cover 8, made for instance of flexible material, on which a rib 7 of boat 5 can rest. The boat 5 has near the edge of its side wall a cylindrical recess 10, a buffer edge 9 and on its upper side a rain gutter. Due to the flowing shape of the joint between cover and trailer very good rainwater removal is obtained.

FIGS. 3a and 3b show the trailer with a tent over it, when the boat is swung about pivot axis 6 to the extended position shown. The pivotally mounted strut constructions 11, 13 have been raised, after which the struts 12 and 14, by means of a slidable joint are pushed along the strut 13 in order to tension the right hand part of the tent construction and for pushing the strut 15 further upwards. After this the strut 11 is pushed to the left at its lower end and again fastened until the whole tent is well stretched.

The low floor of the trailer makes it convenient to enter, while roof or boat part 5 adds to the available floor space.

If it is desired to use part 5 as a boat, the tent can be kept in its place and the aforesaid part 5 removed by extracting the pins of hinges 6. The boat is so constructed, that in quiet waters it will support a number of people without shipping water. When it is desired to use the boat for sailing, or with an outboard motor, a cord is inserted in the groove or channel 10 along the border of the boat, about which cord a canvas cloth has been attached. In FIG. 6 the cord is indicated at 20 and the canvas at 19. See also FIGS. 4 and 5. The cord together with the canvas secured thereabout have an over-all diameter somewhat less than the diameter of the cylindrical recess 10 and can be applied smoothly and quickly. It will be understood that the cord and cover are emplaced simply by properly placing the cover over the boat, then forcing the cord directly into channel 10 through the slot opening thereinto. When the cover 19 is fully and properly applied to the boat, the aforesaid cord secured to and along the edge of the cover, lies within channel 10 and extends from one member 12, FIGURE 5 at one end of the upper edge of the transom, forwardly and continuously along one gunwale, about the prow and back along the other gunwale to the other member 22. Each end of the cord projects beyond the canvas a sufficient distance to enable it to be stretched and tied, or otherwise fastened to a respective one of members 22, or to any other suitable part of the transom at those points. Where, as previously described, hinges having separable halves are used to pivotally connect the boat with the wheel-supported part of the trailer, the hinge halves fixed to the boat at the ends of the upper edge of the stern or transom, make convenient anchorages to which the aforesaid ends of the cord may be affixed.

Figure 5:
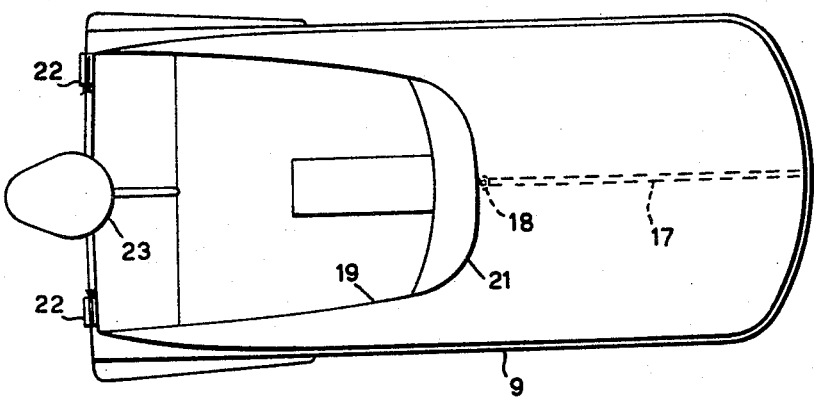
FIG. 5 is a plan view corresponding to FIG. 4.
Figure 6:
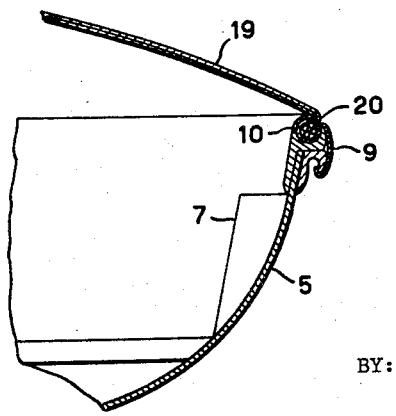
FIG. 6 shows a detail section.

After the cover is thus secured in place it is tautened by the emplacement of a brace or strut 17 extending therebelow, as clearly depicted upon FIGURE 5, from the mid-point of the prow to a central point upon the cover. At this point there is located a vertical tensioning member 18 which, being extensible, acts in an obvious way between the brace and the floor of the boat, to stretch and tauten the cover. Where the canvas cover is so shaped as to define a cockpit opening, a further stretching of the canvas can be effected by attaching and tautening a cord along and to the edge of the canvas defining such opening.

Figure 4:
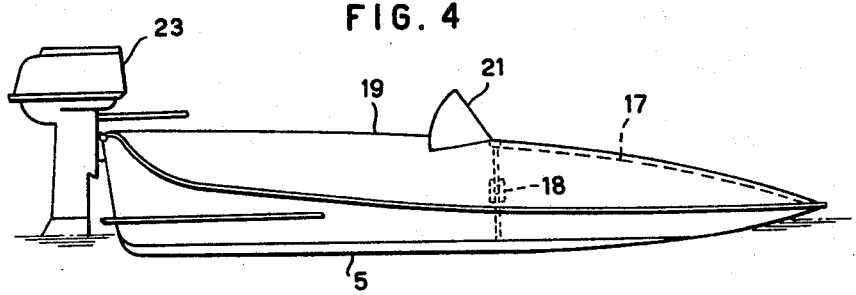
FIG. 4 shows a side elevation of the boat with the fabric stretched thereover.

As shown at FIG. 4 an outboard motor 23 may be attached to the stern, and a spray hood 21 along the forward edge of the canvas defining the cockpit opening.

It will be obvious that the boat shown can also be used as a sailing boat, in which case the tensioning member 18 can be combined with a mast.

To obtain a light and strong construction the boat is preferably made of artificial resin, such as specially reinforced polyester resins. The struts 7 may then be omitted.

A further special advantage of the construction shown is that in the tent only part of the fixed floor will be lacking when the boat is detached, but camping life in other respects can be carried on without any disturbance.

Finally it will be obvious that the boat portion also can be used as a boat for ice sailing, rowing, hunting etc.

I claim:

1. A boat having a square-cut essentially planar stern and gunwale extending from the ends of the upper edge of said stern, downwardly and forwardly in a fair continuous curve to define a rounded prow of lesser height than said stern, said gunwale comrising a thickened edge having a continuous channel therein, there being a slot in said gunwale coextensive with said channel and opening downwardly and inwardly from the exterior thereof, into said channel.

2. The boat of claim 1, and a cover sheet of flexible material having a shape essentially defined by said gunwale, a flexible tension element secured to said sheet along the edges thereof and adapted for a smooth fit in and along said channel, and means to fasten the ends of said tension element to the ends of the edge of said stern, to secure said cover sheet in place, with said cover sheet extending through said slot.

3. The boat of claim 2, said cover sheet when secured to said gunwale, as aforesaid, defining an opening having a smooth continuous fair edge extending from the ends of said stern edge forwardly to a transverse plane between said stern and prow.

4. A boat hull having a square-cut essentially planar stern with normally horizontal upper edge, and gunwale extending in a smooth fair curve forwardly and downwardly from the ends of the upper edge of said stern to terminate in a rounded prow of lesser vertical height than said stern, said gunwale comprising a thickened edge having therein a continuous channel round in transverse section, there being a continuous slot in said thickened edge, coextensive with said channel, and opening outwardly from said channel to the exterior of said gunwale.

5. A boat hull as in claim 4, and a cover of flexible sheet material having a shape essentially the same as said gunwale a flexible cord secured to and extending continuously along the edge of said cover and having a smooth fit within said channel, the ends of said cord being attached to the ends of the upper edge of said stern to tauten said cover over the forward end of said hull, a vertical tensioning member in the vertical central fore-and-aft plane of said hull, between said stern and prow and extending between the floor thereof and said cover, to support the latter, and a brace extending from the upper end of said tensioning member, forwardly and downwardly in said plane, and terminating at said gunwale.

References Cited in the file of this patent

UNITED STATES PATENTS

| | | |
|---|---|---|
| 2,280,729 | Sutton | Apr. 21, 1942 |
| 2,310,431 | Hart | Feb. 9, 1943 |
| 2,505,520 | Bills | Apr. 25, 1950 |
| 2,598,458 | Somers | May 27, 1952 |

FOREIGN PATENTS

| | | |
|---|---|---|
| 515,968 | Germany | Jan. 16, 1931 |
| 533,557 | Germany | Sept. 16, 1931 |
| 535,594 | Germany | Oct. 13, 1931 |